US012370555B2

(12) United States Patent
Billings, Jr. et al.

(10) Patent No.: US 12,370,555 B2
(45) Date of Patent: Jul. 29, 2025

(54) ENHANCED RETRACTABLE FLOW DISCHARGE EXTENSION

(71) Applicant: SAS GLOBAL CORPORATION, Warren, MI (US)

(72) Inventors: David Allen Billings, Jr., Garden City, MI (US); Justin James-Paul Bennett, Novi, MI (US); Kevin Raymond Kleist, Macomb, MI (US)

(73) Assignee: SAS GLOBAL CORPORATION, Warren, MI (US)

( * ) Notice: Subject to any disclaimer, the term of this patent is extended or adjusted under 35 U.S.C. 154(b) by 279 days.

(21) Appl. No.: 18/330,689

(22) Filed: Jun. 7, 2023

(65) Prior Publication Data

US 2024/0408611 A1 Dec. 12, 2024

(51) Int. Cl.
*B02C 23/12* (2006.01)
*B02C 15/00* (2006.01)

(52) U.S. Cl.
CPC ............ *B02C 23/12* (2013.01); *B02C 15/007* (2013.01); *B02C 2015/002* (2013.01)

(58) Field of Classification Search
CPC .. B02C 23/12; B02C 15/007; B02C 2015/002
See application file for complete search history.

(56) References Cited

U.S. PATENT DOCUMENTS 1,480,767 A * 1/1924 Kreutzberg ............. B02C 15/04 241/58
1,523,881 A * 1/1925 Kreutzberg ............. B02C 15/04 241/58
5,386,619 A * 2/1995 Wark .................... B02C 15/007 241/109
5,873,156 A * 2/1999 Wark .................... B02C 15/007 241/109

* cited by examiner

*Primary Examiner* — Bobby Yeonjin Kim
(74) *Attorney, Agent, or Firm* — Young Basile Hanlon & MacFarlane, P.C.

(57) ABSTRACT

An enhanced retractable flow discharge extension is configured for use in a coal pulverizer having a classifier system including a feedpipe to deliver from above raw coal to a pulverizing structure and a classifier cone positioned around the feedpipe to collect oversized coal for the pulverizing structure. The enhanced retractable flow discharge extension is configured to deliver oversized coal to the pulverizing structure and has a conical extension portion having an inlet end configured to be contiguous with the classifier cone outlet, a fixed cylindrical portion having an upper end contiguous with an outlet end of the conical extension portion, a movable cylindrical portion having a circumference larger than a circumference of the fixed cylindrical portion, the movable cylindrical portion being movably attached to the fixed cylindrical portion, and a distal portion movably attached to the movable cylindrical portion, the distal portion having a straight portion and a tapered portion.

4 Claims, 5 Drawing Sheets

ENHANCED RETRACTABLE FLOW DISCHARGE EXTENSION

TECHNICAL FIELD

This disclosure relates generally to coal mill/pulverizers, and more particularly to an enhanced retractable flow discharge extension for the classifier cone.

BACKGROUND

Coal-fired combustion systems such as those used in large utility applications require finely-ground coal particles or fines for efficient operation. In general, it is desirable to use only very-finely pulverized coal in such systems in order to keep NOX emissions and oversized loss-on-ignition unburned coal particles from contaminating the marketable ash byproduct of the combustion chamber. It is accordingly important to maintain close control over the fineness of the pulverized coal fed into the combustion system.

Bowl mill-type pulverizers are commonly used to grind the coal and classify the resulting fines. A vertical feedpipe drops raw coal from several feet above the pulverizer to the center of the pulverizer for grinding. An annular and upwardly-directed flow of air through a ring-shaped throat blows the ground coal particles up and around the pulverizer to a classifier system and combustion chute feeding the combustion chamber. The classifier system removes oversized particles of coal from the flow of air and coal fines, returning them to the pulverizer for regrinding.

A known system for classifying these upwardly traveling fines consists of classifier cone mounted above the pulverizer and concentric with the feedpipe that delivers raw coal to the center of the pulverizer. The lower, smaller outlet end of the classifier cone essentially surrounds the outlet end of the feedpipe, while the larger, upper inlet or mouth of the cone surrounds the combustion delivery chute. As the coal fines and air swirl around in the classifier cone, the heavier particles gravitate to the sides and settle out at the bottom of the cone, while the lighter, more finely ground fines are swirled up and into the entrance of the combustion delivery chute. The original configuration of the coal reject system releases the rejected, oversized coal particles at an elevated height. This can cause the oversized particles to become entrained once again in the airflow caused by the ring-shaped throat and sent back to the classifier. This drastically reduces the efficiency of the classifier system and reduces throughput of the pulverizer.

SUMMARY

Disclosed herein are implementations of an enhanced retractable flow discharge extension for a coal pulverizer. Also disclosed is a coal pulverizer having the enhanced retractable flow discharge extension disclosed herein.

The disclosed implementations of the enhanced retractable flow discharge extension are configured for use in a coal pulverizer having a classifier system including a feedpipe to deliver from above raw coal to a pulverizing structure and a classifier cone positioned around the feed pipe to deliver oversize coal to the pulverizer grinding zone from a classifier cone outlet spaced above the grinding zone. An example of the enhanced retractable flow discharge extension has a conical extension portion having a fixed conical inlet end configured to be contiguous with the classifier cone outlet and an outlet end having a diameter smaller than a diameter of the inlet end. The fixed conical portion has an upper end attached to the outlet of the classifier cone and a fixed cylindrical portion with an outlet smaller than the inlet of the fixed conical portion, a movable cylindrical portion having a circumference larger than a circumference of the fixed cylindrical portion, the movable cylindrical portion being movably attached to the fixed cylindrical portion, and a distal portion movably attached to the movable cylindrical portion, the distal portion having a straight portion and a tapered portion contiguous with the straight portion.

In an extended configuration, a distal end of the telescoping portion is a first distance from the grinding ring, and in a retracted configuration, the distal end of the telescoping portion is a second distance from the grinding ring. The second distance is greater than the first distance. A small chain fall is attached between the classifier cone and the lower cylindrical portion of the enhanced retractable extension to move the telescoping portion between the extended configuration and the retracted configuration. This retraction is done during pulverizer maintenance.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
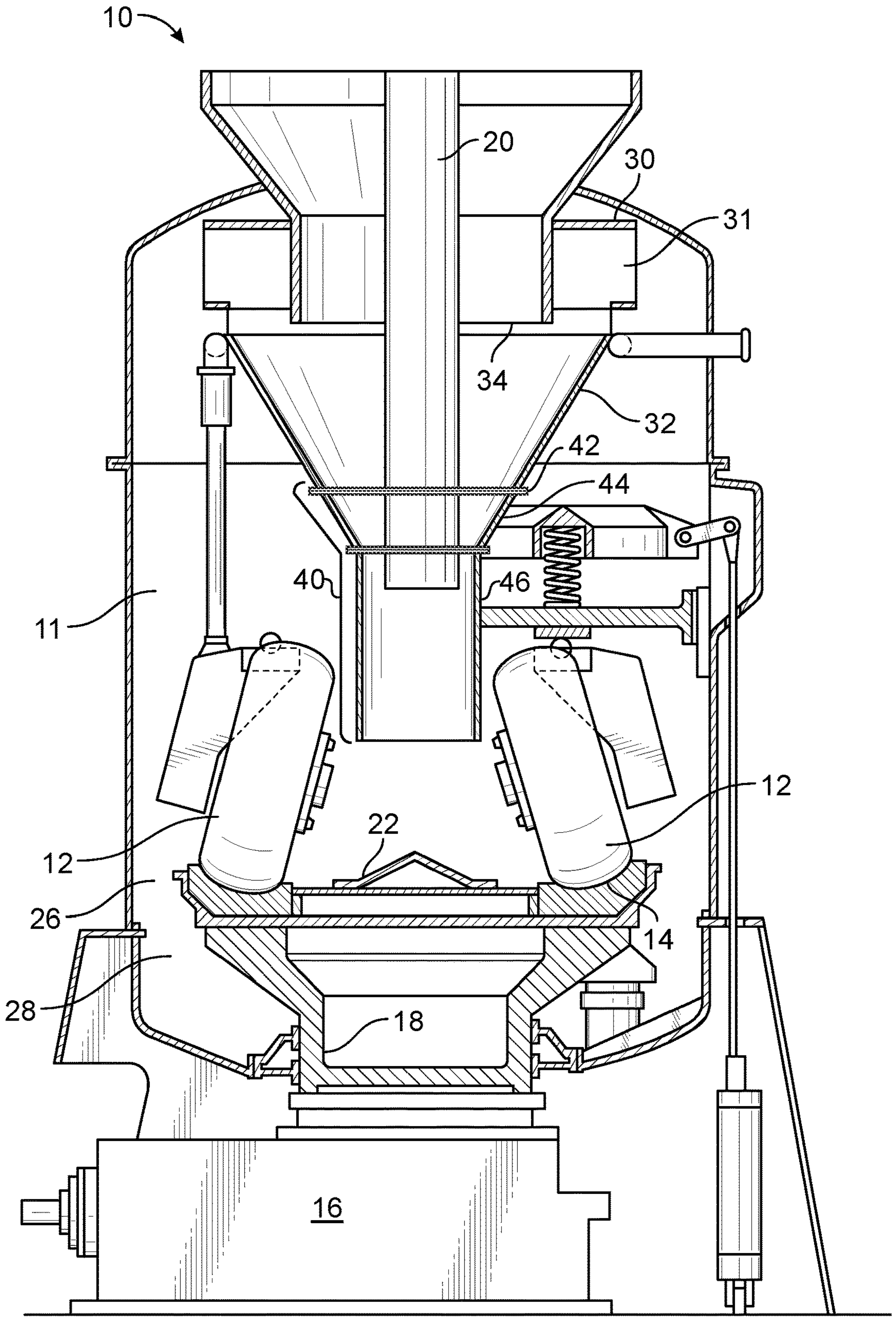
FIG. 1 (Prior Art)
FIG. 1 is a partial side view of a known coal pulverizer.

Referring to FIG. 1, a known bowl mill-type pulverizer 10 with a fixed extension is shown in partial side section, comprising a set of grinding rollers 12 mating with the grinding surfaces of the grinding ring 14. Grinding ring 14 is driven by a standard drive system shown schematically at 16 and a connecting yoke 18 for rotating grinding ring 14 relative to grinding rollers 12. A feedpipe 20 extends from a suitable storage mechanism to deliver raw coal by gravity feed to the center of the bowl mill pulverizer 10. The incoming coal is diverted by a deflector 22 radially outward to the grinding rollers 12 and grinding ring 14, where it is crushed or ground into a relatively fine particulate form.

The base of pulverizer 10 includes a surrounding, ring-shaped pulverizer throat region 26 fed with air from an outside source via plenum 28 to deliver an annular flow of air up and around the periphery of pulverizer 10. Pulverizer throat region 26 may be provided with a throat (not shown) having a number of fixed or adjustable vanes or deflectors which determine the velocity of air flow. The upward, annular air flow through pulverizer throat region 26 lifts the ground coal particles from grinding ring 14 up and around pulverizer 10 in region 11 to the top of the pulverizer. The velocity of air through pulverizer throat region 26 performs an initial classifying function by lifting and carrying only coal particles below a certain size.

The upper end of the pulverizer housing is provided with a further classifying system comprising a classifier cage 30 having a horizontal inlet 31 about its periphery, classifier cone 32, and a combustion delivery chute 34. Classifier cage 30, classifier cone 32 and combustion delivery chute 34 are mounted in concentric fashion about feedpipe 20. The upper end of classifier cone 32 surrounds the combustion delivery chute 34, with classifier cage 30 filling the gap therebetween. The annular lifting flow of air and coal fines from pulverizer throat region 26 accordingly enters classifier cone 32 and combustion delivery chute 34 through classifier cage 30.

Classifier cage 30 includes a number of vanes/blades (not shown) which impart a centrifugal component to the air and coal fine flow entering the cone from region 11 of the pulverizer. As the coal fines and air swirl around in the classifier cone, the heavier particles gravitate to the sides and settle out at the bottom of the cone, while the lighter, more finely ground fines are swirled up and into the combustion delivery chute to the combustion chamber.

A fixed classifier cone extension 40 is fastened to classifier cone 32 at 42, such as with bolts or welds. The fixed classifier cone extension 40 includes an upper cone-shaped portion 44 contiguous with classifier cone 32, and a fixed cylindrical tailing portion 46 concentric with feedpipe 20. The upper cone-shaped portion 44 provides time for the coal fines to be swirled around and classified in classifier cone 32. The reject fines which require regrinding in the pulverizer spiral down and are further drawn by the feedpipe flow onto the pulverizer grinding zone in a manner which decreases the likelihood of reject fines being blown back up into or around the classifier cone.

Although the fixed classifier cone extension 40 prevents oversized reject fines and small pieces of raw feed coal from being blown back up through or around the classifier cone, the fixed extension section 46 interferes with access for internal pulzerizer maintenance and requires significate time to remove and reinstall.

To address these and other concerns with the pulverizer 10, an enhanced retractable flow discharge extension is disclosed herein. The enhanced retractable flow discharge extension enables the retraction of the tailing portion up towards the upper cone-shaped portion, moving the tailing portion away from the grinding rollers 12. The retraction of the tailing portion provides access to each grinding roller without interference, enabling maintenance to be performed without the need to work around the tailing portion. The enhanced retractable flow discharge extension does not require tools or the removal of sections to retract. It is easily retracted with the use of two small chain falls, for example.

The enhanced retractable flow discharge extension disclosed herein has a tapered distal end, which directs the oversized material to the center of the grinding table as it falls. This helps to keep the coal bed even, promotes smooth consistent grinding and prevents the oversized material from being deflected and entrained in the airflow back to the classifier before it is reground.

Figure 2A:
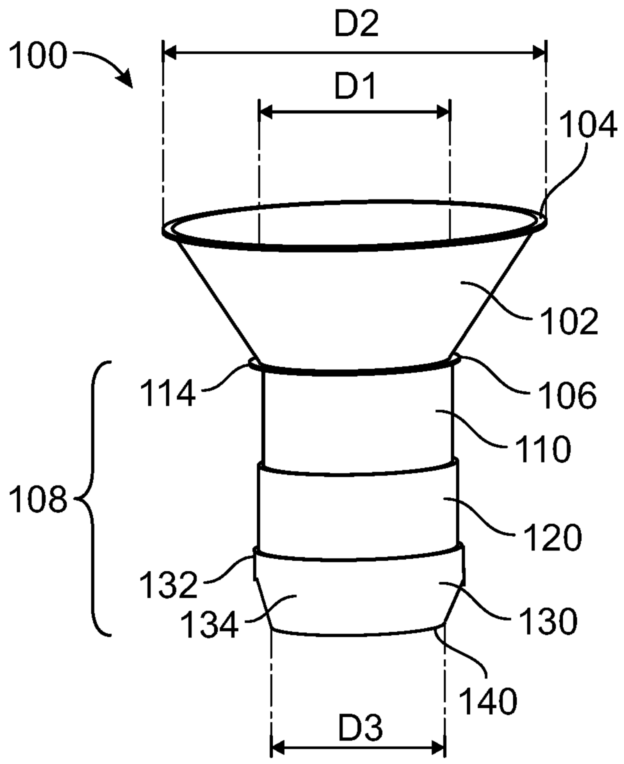
FIG. 2A is a perspective view of the enhanced retractable flow discharge extension in an extended configuration as disclosed herein.
Figure 2B:
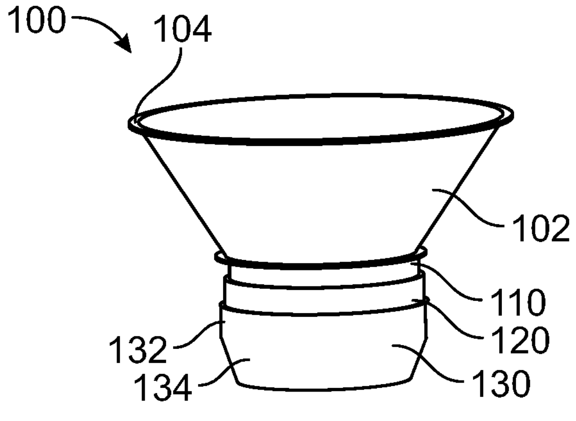
FIG. 2B is a perspective view of the enhanced retractable flow discharge extension in a retracted configuration as disclosed herein.
Figure 3A:
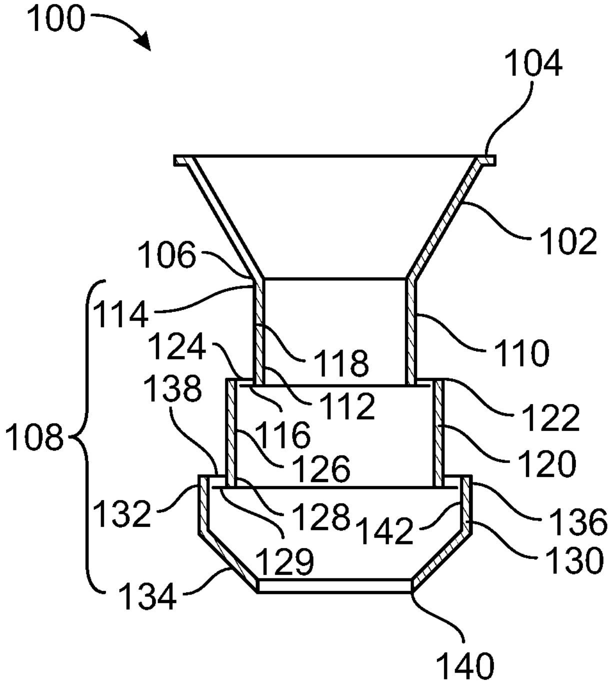
FIG. 3A is a cross-sectional view of FIG. 2A.
Figure 3B:
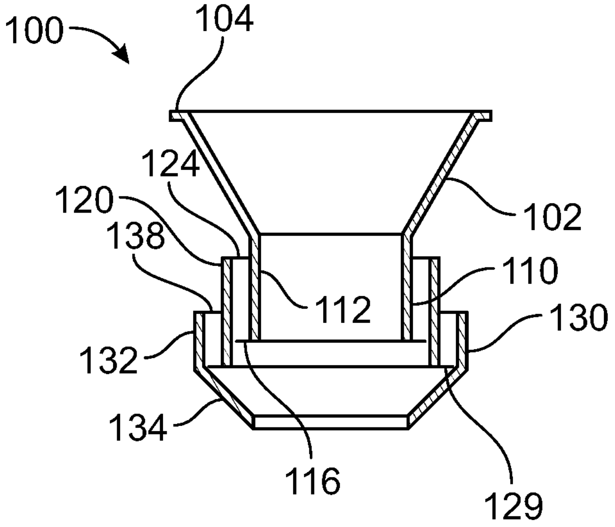
FIG. 3B is a cross-sectional view of FIG. 2B.

FIGS. 2A and 2B are perspective views of the enhanced retractable flow discharge extension 100 shown in an extended configuration and a retracted configuration, respectively. FIGS. 3A and 3B are cross-sectional views of FIGS. 2A and 2B. The enhanced retractable flow discharge extension 100 can be retrofitted into existing coal pulverizers, attached to the classifier cone 32 via means known to those skilled in the art, such as welding or bolting.

The enhanced retractable flow discharge extension 100 has a conical extension portion 102 having an inlet end 104 configured to be contiguous with an outlet 36 the classifier cone 32 and an outlet end 106 having a diameter D1 smaller than a diameter D2 of the inlet end 104. A telescoping portion 108 extends from the conical extension portion 102. The telescoping portion 108 has a fixed cylindrical portion 110, a movable cylindrical portion 120, and a distal portion 130.

The fixed cylindrical portion 110 has a lower end 112 and an upper end 114 contiguous with the outlet end 106 of the conical extension portion 102. The movable cylindrical portion 120 has a circumference larger than a circumference of the fixed cylindrical portion 110 so that the movable cylindrical portion 120 can retract over the fixed cylindrical portion 110. The movable cylindrical portion 120 is thus movably attached to the fixed cylindrical portion 110. The distal portion 130 is movably attached to the movable cylindrical portion 120. The distal portion 130 has a straight portion 132 and a tapered portion 134 contiguous with the straight portion 132. The straight portion 132 of the distal portion 130 has a circumference greater than the circumference of the movable cylindrical portion 120 so that the straight portion 132 can retract over the movable cylindrical portion 120.

The tapered portion 134 of the distal portion 130 has a distal end 140 with a distal end diameter $D_3$. The distal end diameter $D_3$ can be the same as the diameter $D_1$ of the outlet end 106 of the conical extension portion 102. This allows for a fairly consistent flow channel while the tapered portion 134 directs the oversized material to the center of the grinding ring 14. Alternatively, the distal end diameter $D_3$ may be smaller than the diameter $D_1$ of the outlet end 106 so long as flow is not impeded.

The fixed cylindrical portion 110 has at the lower end 112 a first flange 116 extending outwardly from the lower end 112. The first flange 116 extends perpendicular to a wall 118 of the fixed cylindrical portion 110. The first flange 116 can extend around an entire perimeter of the fixed cylindrical portion 110. Alternatively, the first flange 116 can extend at intervals around the perimeter of the fixed cylindrical portion 110.

The movable cylindrical portion 120 has an upper end 122 and a second flange 124 extending inwardly from the upper end 122. The second flange 124 extends perpendicular to a wall 126 of the movable cylindrical portion 120. The second flange 124 can extend around an entire inner perimeter of the movable cylindrical portion 120. Alternatively, the second flange 124 can extend at intervals around the inner perimeter of the movable cylindrical portion 120 so long as those intervals align with the first flange 116. The movable cylindrical portion 120 also has a lower end 128 and a third flange 129 extending outwardly from the lower end 128. The third flange 129 extends perpendicular to the wall 126 of the movable cylindrical portion 120. The third flange 129 can extend around an entire outer perimeter of the movable cylindrical portion 120. Alternatively, the third flange 129 can extend at intervals around the outer perimeter of the movable cylindrical portion 120.

The distal portion 130 has an upper end 136 and a fourth flange 138 extending inwardly from the upper end 136. The fourth flange 138 extends perpendicular to a wall 142 of the straight portion 132 of the distal portion 130. The fourth flange 138 can extend around an entire inner perimeter of the straight portion 132. Alternatively, the fourth flange 138 can extend at intervals around the inner perimeter of the straight portion 132 so long as those intervals align with the third flange 129.

FIGS. 2A and 3A show the enhanced retractable flow discharge extension 100 in the extended configuration. In the extended configuration, the first flange 116 and the second flange 124 are in contact, with the movable cylindrical portion 120 carried by the first flange 116 of the fixed cylindrical portion 110. The third flange 129 and the fourth flange 138 are also in contact, with the distal portion 130 being carried by the third flange 129 of the movable cylindrical portion 120.

FIGS. 2B and 3B show the enhanced retractable flow discharge extension 100 in the retracted configuration. In the retracted configuration, the movable cylindrical portion 120 slides over the fixed cylindrical portion 110, and the straight portion 132 of the distal portion 130 slides over the movable cylindrical portion 120.

Figure 4A:
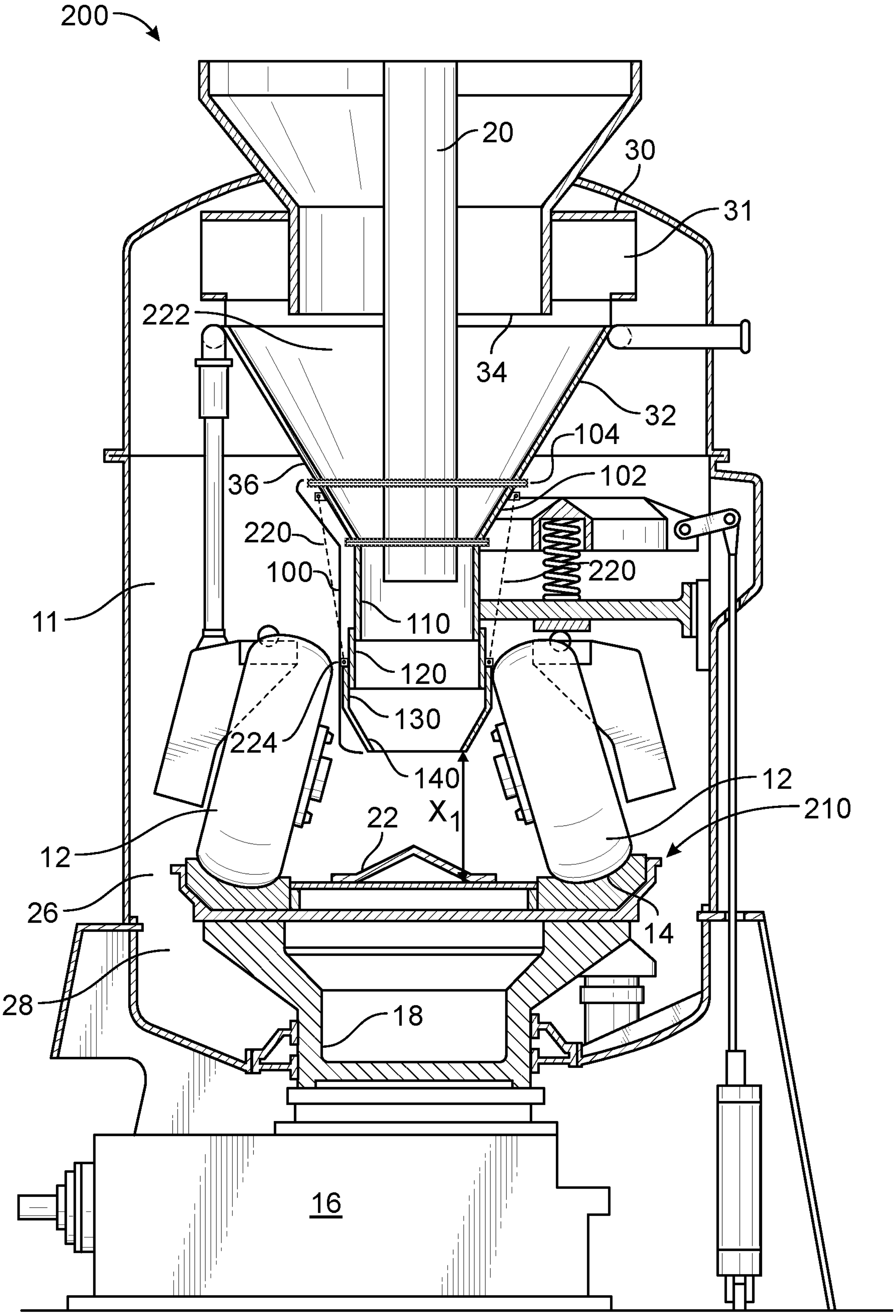
FIG. 4A is a partial side view of a coal pulverizer system using the disclosed enhanced retractable flow discharge extension in the extended configuration.
Figure 4B:
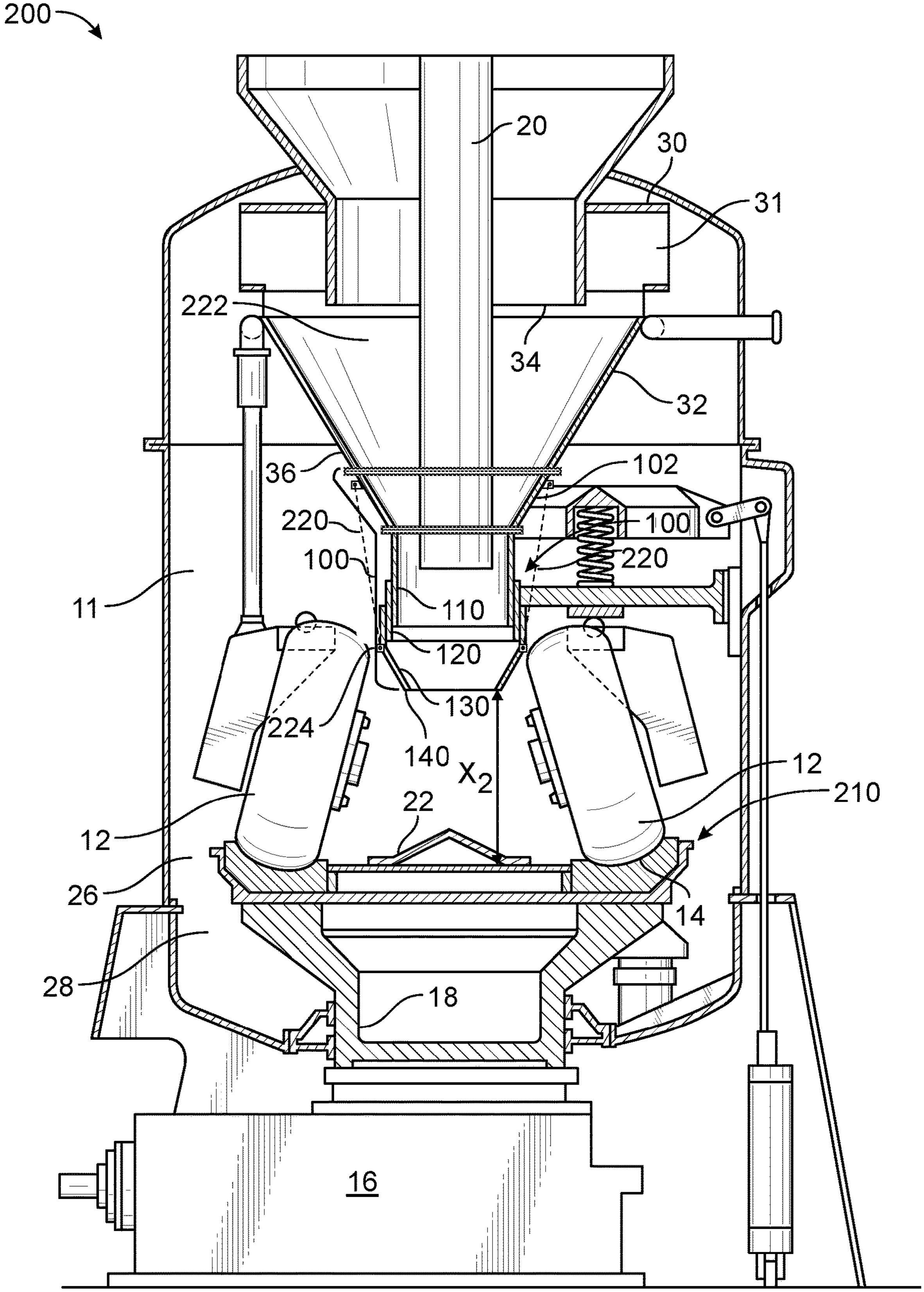
FIG. 4B is a partial side view of the coal pulverizer system with the disclosed enhanced retractable flow discharge extension in the retracted configuration.

FIGS. 4A and 4B illustrate a coal pulverizer system 200 using the enhanced retractable flow discharge extension 100 as disclosed herein. Parts of the coal pulverizer system 200 that are identical to those in FIG. 1 are numbered the same.

The coal pulverizer system 200 has a pulverizing structure 210 that includes the grinding ring 14 above which are grinding rollers 12. The feedpipe 20 delivers from above raw coal to the pulverizing structure 210. The classifier cone 32 is positioned around the feedpipe 20 to collect oversized coal for the pulverizing structure 210. The enhanced retractable flow discharge extension 100 is contiguous with the classifier cone 32 and configured to deliver the oversized coal to the pulverizing structure 210.

The enhanced retractable flow discharge extension 100 is shown in FIG. 4A in the extended configuration described with respect to FIGS. 2A and 3A. As shown, in the extended configuration, the distal end 140 of the telescoping portion 108 is a first distance $X_1$ from the grinding ring 14. The enhanced retractable flow discharge extension 100 is shown in FIG. 4B in the retracted configuration described with respect to FIGS. 2B and 3B. As shown, in the retracted configuration, the distal end 140 of the telescoping portion 108 is a second distance $X_2$ from the grinding ring 14. The second distance $X_2$ is greater than the first distance $X_1$.

The enhanced retractable flow discharge extension 100 is moved between the extended configuration and the retracted configuration by at least one chain fall 220, with two small chain falls illustrated. The chain falls 220 are attached to the upper portion of 100 on each side of the fixed conical section 102. The two chain falls 220 attach to the telescoping portion 108 to move the telescoping portion 108 between the extended configuration and the retracted configuration. The two chain falls 220 can be attached to the distal portion 130 of the telescoping portion 108 via a connection member 224 such as an eye hook or the like.

During operation, the enhanced retractable flow discharge extension 100 is in the extended position to deliver the oversized material to the grinding ring 14. When maintenance is required in the pulverizing structure 200, the chain falls 220 are used to retract the telescoping portion 108 of the enhanced retractable flow discharge extension 100, removing the telescoping portion 108 from obstructing the pulverizing structure 200. The retracted configuration allows for access to the pulverizing structure 200 for maintenance without having to physically remove some or all of the enhanced retractable flow discharge extension and then reinstalling it after maintenance is complete.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A coal pulverizer system comprising:

a pulverizing structure having a grinding ring above which are grinding rollers;

a feedpipe to deliver from above raw coal to the pulverizing structure;

a classifier cone positioned around the feedpipe to collect oversized coal for the pulverizing structure;

an enhanced retractable flow discharge extension contiguous with the classifier cone and configured to deliver the collected oversized coal back to the pulverizing structure, the enhanced retractable flow discharge extension having a conical extension portion and a telescoping portion, wherein:

in an extended configuration, a distal end of the telescoping portion is a first distance from the grinding ring; and in a retracted configuration, the distal end of the telescoping portion is a second distance from the grinding ring, the second distance being greater than the first distance; and at least one removable chain fall means attached to the conical extension portion and attached to the telescoping portion to move the telescoping portion thereof between the extended configuration and the retracted configuration; and wherein the telescoping portion comprises:

a fixed cylindrical portion having an upper end contiguous with an outlet end of the conical extension portion;

a movable cylindrical portion having a circumference larger than a circumference of the fixed cylindrical portion, the movable cylindrical portion being movably attached to the fixed cylindrical portion; and a distal portion movably attached to the movable cylindrical portion, the distal portion having a straight portion and a tapered portion contiguous with the straight portion.

2. The coal pulverizer system of claim 1, wherein:

the fixed cylindrical portion has lower end and a first flange extending outwardly from the lower end; and the movable cylindrical portion has an upper end and a second flange extending inwardly from the upper end, the first flange and the second flange in contact when the enhanced retractable flow discharge extension is in the extended configuration.

3. The coal pulverizer system of claim 2, wherein:

the movable cylindrical portion has a lower end and a third flange extending outwardly from the lower end; and the distal portion has an upper end and a fourth flange extending inwardly from the upper end, the third flange and the fourth flange in contact when the enhanced retractable flow discharge extension is in the extended configuration.

4. The coal pulverizer system of claim 1, wherein the distal portion has a distal end with a distal end diameter, the distal end diameter being the same as the diameter of the outlet end of the conical extension portion.

* * * * *